United States Patent [19]

Steigerwald et al.

[11] Patent Number: 4,695,934
[45] Date of Patent: Sep. 22, 1987

[54] MULTIPLE OUTPUT RESONANT POWER SUPPLY

[75] Inventors: Robert L. Steigerwald, Scotia, N.Y.; Keku M. Mistry, Fort Walton Beach, Fla.

[73] Assignee: General Electric Company, Schenectady, N.Y.

[21] Appl. No.: 733,349

[22] Filed: May 13, 1985

[51] Int. Cl.[4] .......................................... H02M 3/335
[52] U.S. Cl. ...................................... 363/17; 363/24; 363/48; 363/98; 363/134
[58] Field of Search ....................... 363/16, 17, 24, 79, 363/80, 97, 98, 132, 133, 134, 45, 47, 48

[56] References Cited

U.S. PATENT DOCUMENTS

| | | | |
|---|---|---|---|
| 3,473,040 | 10/1969 | Cominassi et al. | 363/17 |
| 3,571,692 | 3/1971 | Andren | 363/16 |
| 3,745,440 | 7/1973 | Lord | 363/17 |
| 4,031,452 | 6/1977 | Longa et al. | 363/17 |
| 4,504,895 | 3/1985 | Steigerwald | 363/17 |
| 4,541,041 | 9/1985 | Park et al. | 363/98 |

Primary Examiner—R. Skudy
Assistant Examiner—Anita M. Ault
Attorney, Agent, or Firm—Marvin Snyder; James C. Davis, Jr.

[57] ABSTRACT

A resonant converter feeds five load circuits while maintaining excellent voltage regulation. The power converter features a non-bifilar wound transformer with the resonant capacitors serving the dual function of suppressing diode voltage switching transients while forming the resonant circuit in conjunction with the transformer. Overcurrent circuit protection is also provided.

7 Claims, 4 Drawing Figures

4,695,934

MULTIPLE OUTPUT RESONANT POWER SUPPLY

BACKGROUND OF THE INVENTION

The present invention relates in general to a power supply having multiple outputs, each with a different DC voltage and more specifically to a resonant power supply wherein the multiple DC output voltages are regulated by changing the frequency of the voltage supplied to the resonant circuit.

It is well known in the art to used a DC to AC converter to supply voltage to a resonant circuit and to rectify the voltage across the resonant circuit so that a variable DC voltage may be obtained by varying the frequency of the DC to AC converter. It is also known that the resonant circuit may include a transformer, as shown for example by U.S. Pat. No. 4,504,895, issued Mar. 12, 1985 and assigned to the assignee of this application. Thus, by using multiple secondary windings (either separate windings or a multiply tapped secondary) a plurality of DC voltages can be obtained.

In the prior art, bifilar windings are typically used in the transformer secondary to maximize coupling between the secondary windings. However, as the number of bifilar windings increases, the winding procedure becomes complicated and thus expensive. Furthermore, if several pairs of windings are involved, bifilar windings lead to a bulky secondary and to voltage insulation problems. On the other hand, the close coupling of bifilar windings desirably suppresses voltage transients across the output rectifiers.

Accordingly, it is a principal object of the present invention to provide a multiple output resonant power supply having a single power converter and a single transformer.

It is a further object of the invention to provide a multiple output resonant power supply with a transformer having a non-bifilar wound secondary.

It is another object of the invention to provide accurate regulation of the DC output voltages of a multiple output resonant power supply.

It is another object of the invention to provide a DC power supply having high efficiency and low cost.

SUMMARY OF THE INVENTION

These and other objects are achieved in a multiple output resonant power supply comprising a transformer, capacitive means and a plurality of diodes. The transformer has a primary winding and a multiple secondary windings connected in series and having a plurality of taps therebetween. The primary winding is adapted to receive a variable frequency voltage. The multiple secondary windings are layered on a single core. The capacitive means is coupled across the plurality of multiple secondary windings and includes a pair of capacitors connected in series across the multiple secondary windings. The junction of the pair of capacitors is connected to a selected one of the taps. Each diode of the plurality of diodes has its anode connected to a separate one of the taps. The cathodes of said diodes are connected in pairs, the diodes of each pair beng connected to the multiple secondary windings on opposite sides of the one selected tap. Thus, a plurality of DC voltages are provided between the one selected tap and each of the diode pairs. The DC voltages may be regulated by controlling the frequency of the AC voltage supplied to the transformer primary.

BRIEF DESCRIPTION OF THE INVENTION

The novel features of the invention are set forth with particularity in the appended claims. The invention itself, however, as to organization and method of operation, together with further objects and advantages thereof, may best be understood by reference to the following description taken in conjunction with the accompanying drawings in which:

DETAILED DESCRIPTION OF THE INVENTION

Figure 1:
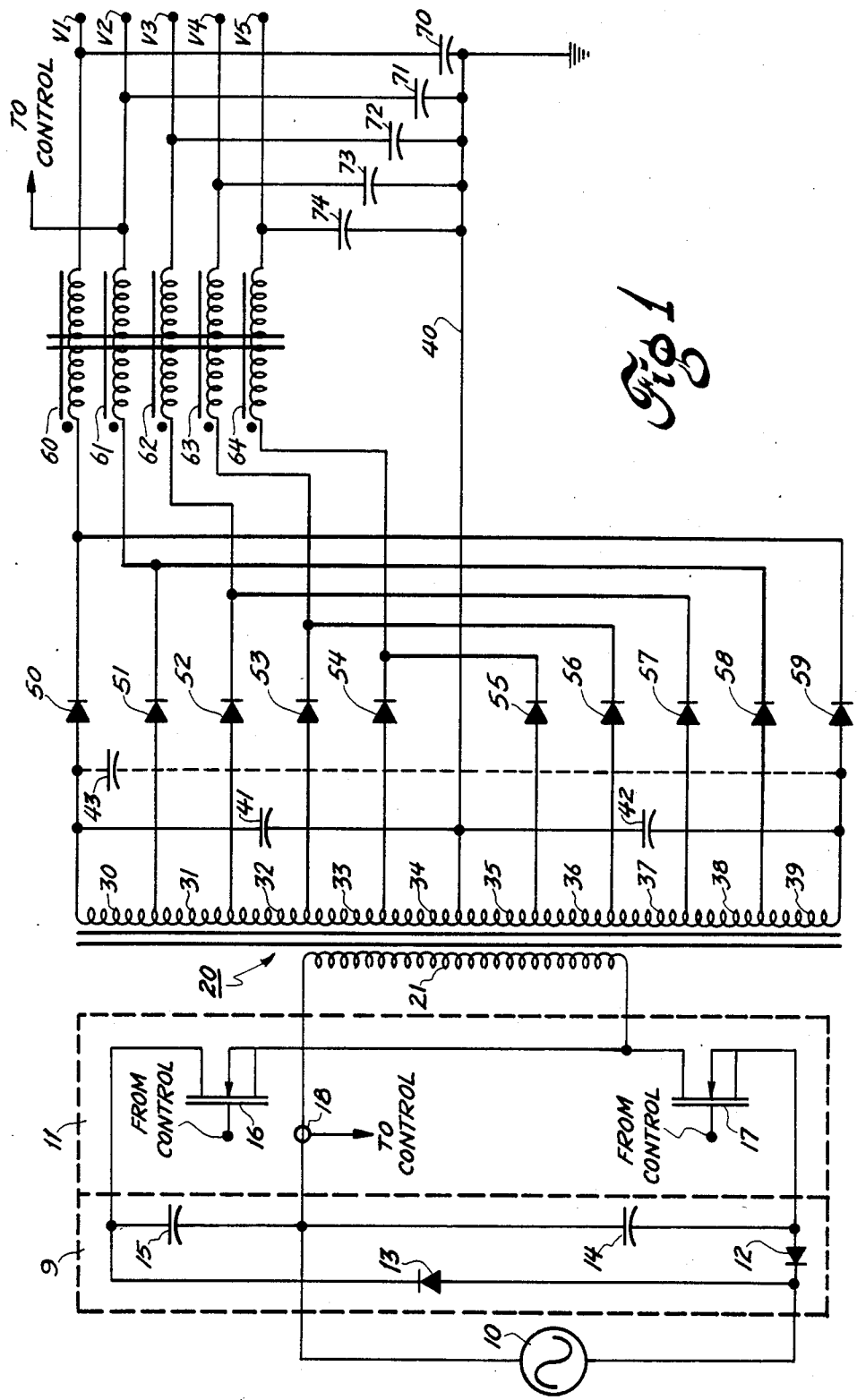
FIG. 1 is a schematic diagram of the resonant power supply of the present invention.

Referring now to FIG. 1, an apparatus for converting a supplied DC voltage to a plurality of regulated DC voltages V1-V5 will be described. A DC to AC converter 11 supplies a variable frequency AC voltage to a transformer 20. Converter 11 may have any configuration known in the art, a half-bridge converter being shown in the drawing. Converter 11 comprises a pair of semiconductor switching devices 16 and 17, connected in series. Switching devices 16 and 17 are shown as field-effect transistors (FETs), although other devices such as insulated gate transistors (IGTs) or gate turn-off thyristors (GTOs) may be used. Converter 11 is connected to a supplied DC voltage. In this case, the DC voltage is obtained by rectifying an AC source 10 with a voltage doubler 9 comprised of diodes 12 and 13 and capacitors 14 and 15. A voltage dobler is used to allow the half-bridge converter to provide an AC voltage with a magnitude equal to that of source 10. On every other half cycle of source 10, capacitor 14 is charged through diode 12. Capacitor 15 is charged through diode 13 on the other half cycles.

A primary winding 21 of transformer 20 is connected between the junction of FETs 16 and 17 and the junction of capacitors 14 and 15. By alternately switching on FETs 16 and 17, an AC voltage having a variable frequency and an RMS magnitude equal to the RMS magnitude of supply 10 is supplied to primary winding 21. The gates of FETs 16 and 17 are connected to a control circuit which will be described below with reference to FIG. 3. Converter 11 also includes a current sensor 18 for supplying a current signal to the control circuit.

Figure 1A:
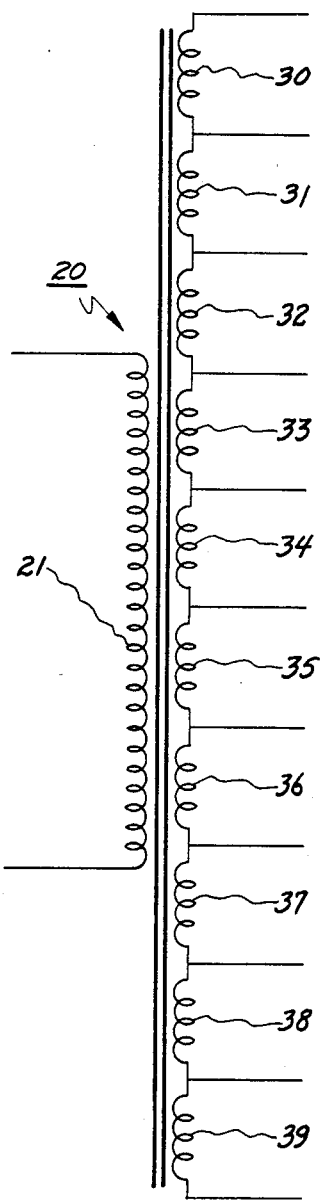
FIG. 1a is a schematic diagram of transformer 20 employing another type of secondary useful in the resonant power supply of FIG. 1.

Transformer 20 has a single secondary winding comprised of an even plurality of secondary winding segments 30-39 connected in series. The transformer secondary includes a center tap 40 which serves as ground for the DC outputs. Preferably, secondary winding segments 30-39 are symmetrical about center tap 40 as to number of turns and wire gauge. As an alternate, electrically equivalent form of transformer 20 secondary, a plurality of separate, series-connected windings may be employed, with taps between adjacent separate windings 30-39 as shown in FIG. 1a. As used herein, the term "multiple secondary windings" is intended to encompass transformer secondaries of the type shown in both FIG. 1 and FIG. 1a.

Figure 2:
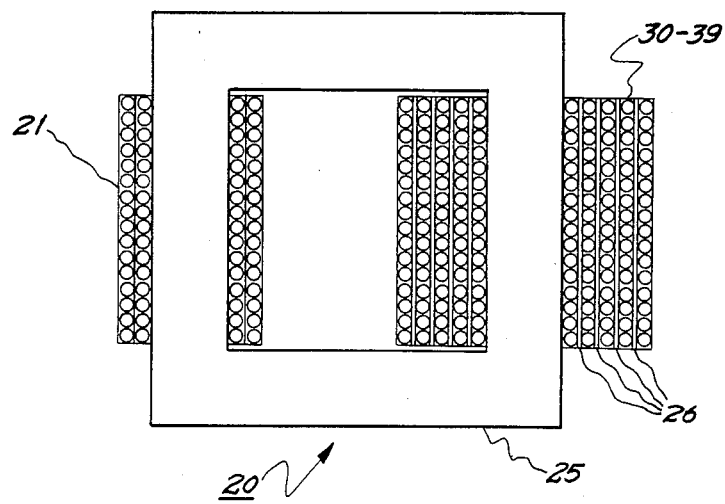
FIG. 2 is a cross-sectional view of the transformer of the present invention.

A preferred construction for transformer 20 is shown in FIG. 2. Primary winding 21 is would on one leg of core 25 multiple. Secondary windings 30-39 are wound on another leg. To maintain tight coupling between the secondary windings multiple. Secondary windings 30-39 are layered on top of each other separated by thin sheets of insulator 26.

Returning to FIG. 1, a pair of capacitors 41 and 42 are connected across the transformer secondary. The junction of cpacitors 41 and 42 is connected to center tap 40. The leakage inductance resulting from the relatively loose coupling between primary winding 21 and multiple secondary windings 30-39 (as a result of winding primary and secondaries on different legs of the core) serves as a resonant inductor which resonates with capacitors 41 and 42. An optional capacitor 43 may be included in the resonant circuit, directly across the transformer secondary to assist in tuning the resonant circuit. Rectifying diodes 50-59 rectify the currents from secondary windings 30-39, respectively, providing five DC voltages. The cathodes of diodes 50-59 are connected in pairs, the diode anodes in each pair being connected to opposite sides of center tap 40. Preferably, diodes 50-59 are connected in a symmetric configuration as in FIG. 1.

The cathodes of each pair of diodes are connected to a separate filter, respectively. Thus, a DC output voltage V1 is filtered by an inductor 60 and a capacitor 70. Each of inductors 60-64 provides a continuous current with minimum ripple to the load respectively connected thereto, thereby eliminating transient currents in transformer 20 and output capcitors 70-74. Inductors 60-64 are all wound on a single core and are tightly coupled magnetically. The number of turns of each inductor is proportional to each respective output voltage V1-V5. This winding arrangement improves the cross-regulation (i.e. indirect regulation) of the output voltages V1-V5 which are not coupled to the control circuit, as described below.

Since multiple secondary windings 30-39 are layered, they are less closely coupled than bifilar windings. This loss in coupling tends to introduce transient voltage spikes across the rectifying diodes as current commutates from one half of the transformer secondary (e.g. multiple secondary windings 30-34) to the other half (e.g. multiple secondary windings 35-39). However, the placement of capacitors 41 and 42 from line to center tap (common) smoothes the current commutations. Thus, resonant capacitors 41 and 42 act as lossless snubbers, reducing the voltage stresses and switching losses of diodes 50-59.

Figure 3:
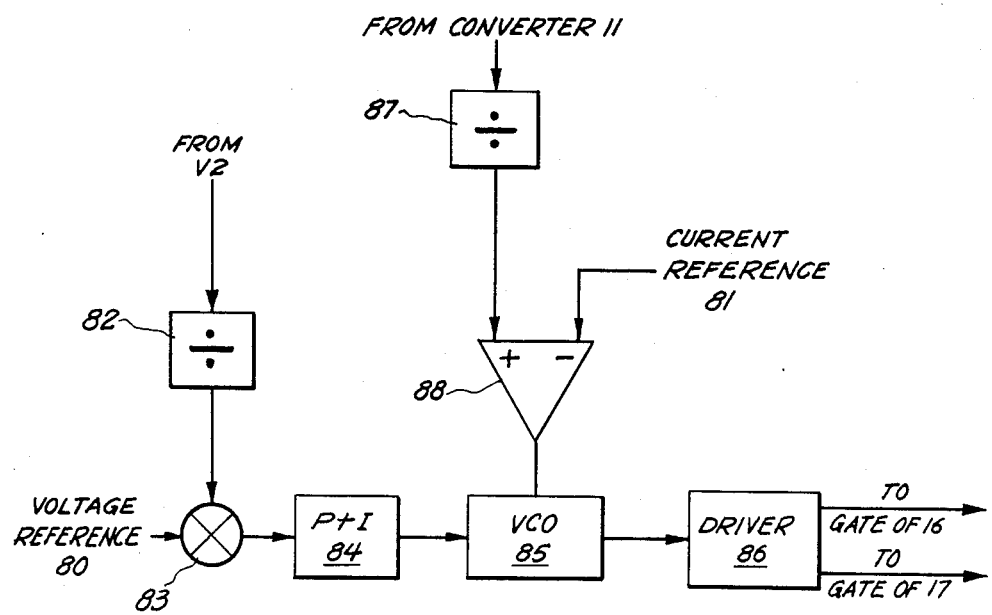
FIG. 3 is a block diagram of a control for regulating the DC output voltages of the supply of FIG. 1.

Turning now to FIG. 3, a control circuit is shown which regulates DC output voltages V1-V5 (FIG. 1) by varying the output frequency of DC to AC converter 11 (FIG. 1). One of the DC output voltages, V2 for example, is provided to a voltage divider/attenuator 82 to provide a measured voltage which may be directly regulated by the control. The measured voltage is compared to a voltage reference 80 in a summer 83, producing an error signal. The error signal is processed in a proportional-integral (P-I) controller 84 which in turn controls a voltage controlled oscillator (VCO) 85. Preferably, the output of VCO 85 is limited to frequencies above resonance of the resonant circuit.

A driver circuit 86 is connected to VCO 85 and to the gates of FETs 16 and 17. Such driver circuits are known in the art. By way of example, driver circuit 86 may include a flip-flop for toggling by the output signal of VCO 85 to provide two complementary signals. In addition, a lock-out circuit (not shown) in driver 86 may provide a minimum dead time between successive switchings to prevent shoot through of converter 11.

The control circuit also provides overcurrent protection. A current signal from current sensor 18 (FIG. 1) is provided to voltage divider/attenuator 87 to provide a measured current signal. The measured current signal is provided to the noninverting input of a comparator 88. A current reference signal 81 is provided to the inverting input of comparator 88. The output of comparator 88 is coupled to VCO 85. Thus, if the measured current signal exceeds the current reference signal, VCO 85 is set to its maximum. This increases the frequency of converter 11 and reduces the total current therein. By providing a substantial amount of hysteresis in comparator 88, the output frequency of VCO 85 will be lowered only gradually.

The foregoing discloses a resonant power supply with multiple DC outputs but only a single power converter and a single transformer. By winding the output filter inductors on a sngle core, the multiple output voltages more nearly track one another. By layering the secondary windings, savings in size, weight and cost are achieved over bifilar windings. By placing a pair of resonant capacitors from each line to center tap, voltage transients across the rectifier diodes are reduced. A control circuit provides direct regulation of one of the output voltages and indirect regulation of the others by virtue of the close coupling of the transformer secondary windings and the close coupling of the output filter inductors. When desired, local series regulators may be used to improve the regulation of the indirectly regulated output voltages.

While preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. A multiple output resonant power supply comprising:
    a transformer having a primary winding and multiple secondary windings, said secondary windings connected in series and having a tap between each pair of adjacently connected windings, one of the taps comprising a center tap and the remainder of the taps being equal in number on both sides of the center tap, said primary winding being wound on a single core and adapted to receive a variable frequency voltage, said multiple secondary windings being layered on said single core;
    capacitive means including a pair of directly connected in series across said secondary windings, the junction of said pair of capacitors being connected to said center tap; and
    a plurality of diodes each having its anode connected to a separate one of said remainder of the taps, respectively, the cathodes of said diodes being connected in pairs, the diodes of each of said pairs being connected to said secondary windings on opposite sides of said center tap;
    whereby a plurality of DC voltages are provided between said center tap and each of said diode pairs.

2. The power supply of claim 1 further comprising a plurality of filters each connected between said center tap and one of said diode pairs, respectively.

3. The power supply of claim 2 wherein each of said filters includes a series inductor, the series inductors of said filters being wound on a single core.

4. The power supply of claim 2 further comprising DC to AC conversion means connected to said primary winding and adapted to be connected to a DC supply, said conversion means being adapted to supply a variable frequency AC voltage to said primary winding for controlling the resonant voltage across said multiple secondary windings and said capacitive means.

5. The power supply of claim 4 further comprising a controller for controlling the frequency of said conversion means to regulate the DC voltage across said filters, said controller including:
- comparison means for comparing the voltage across a predetermined one of said filters to a voltage reference, said comparison means generating an error signal;
- a proportional-integral controller connected to said comparison means for receiving said error signal as an input;
- a voltage controlled oscillator coupled to the output of said proportional-integral controller for supplying a signal having a frequency greater than the resonant frequency of the combination of said transformer and said capacitive means; and
- a comparator for comparing the current in said primary winding with a current reference, the output of said comparator being coupled to said voltage controlled oscillator for increasing the frequency of said signal supplied by said voltage controlled oscillator when primary winding current exceeds said current reference.

6. The power supply of claim 5 wherein said DC to AC conversion means comprises a converter having a plurality of controllable switching elements, and wherein said controller further includes a gate driver circuit for switching said controllable switching elements at the frequency of said voltage controlled oscillator signal and for turning all of said controllable switching elements off momentarily between successive switchings.

7. The power supply of claim 1 wherein said cathodes are connected symmetrically in pairs about said one selected tap.

* * * * *